United States Patent
Fulmer et al.

[11] 3,969,898
[45] July 20, 1976

[54] RESERVE RESERVOIR COVER

[75] Inventors: Keith H. Fulmer, South Bend, Ind.; Raymond Kosarski, Jr.; Harold W. Hughes, both of St. Joseph, Mich.

[73] Assignee: The Bendix Corporation, South Bend, Ind.

[22] Filed: June 30, 1975

[21] Appl. No.: 591,749

[52] U.S. Cl. .................................. 60/534; 60/592
[51] Int. Cl.² ............................................. B60T 17/22
[58] Field of Search ............. 60/534, 535, 586, 592, 60/591

[56] References Cited
UNITED STATES PATENTS

| | | | |
|---|---|---|---|
| 1,930,033 | 10/1933 | Apple | 60/592 X |
| 3,448,579 | 6/1969 | Reznicek | 60/535 |
| 3,461,671 | 8/1969 | Venema | 60/535 X |
| 3,520,136 | 7/1970 | Stiward | 60/534 X |
| 3,792,433 | 2/1974 | Wada | 60/534 UX |

FOREIGN PATENTS OR APPLICATIONS

| | | | |
|---|---|---|---|
| 536,932 | 4/1955 | Belgium | 60/534 |

*Primary Examiner*—Martin P. Schwadron
*Assistant Examiner*—H. Burks, Sr.
*Attorney, Agent, or Firm*—Leo H. McCormick, Jr.; W. N. Antonis

[57] ABSTRACT

A cover for a retention chamber in a master cylinder reservoir which will permit a probe to pass through a tab and pressurize a piston in a pressurizing chamber with a test fluid under pressure. This test fluid will allow an operator to visually inspect the master cylinder for fluid failures at various pressures. In the normal operation, the tab of the cover will allow fluid to flow from a supply chamber into the retention chamber. However, during a brake application when fluid is transmitted through the compensator port as the pressurizing piston moves past the compensator port, the tab will prevent this fluid from being squirted into the supply reservoir. This will assure that a minimum quantity of fluid is always present in the retention chamber to operate the brake system even though a low fluid level indicator in the supply chamber presents a failure warning signal to the operator.

7 Claims, 3 Drawing Figures

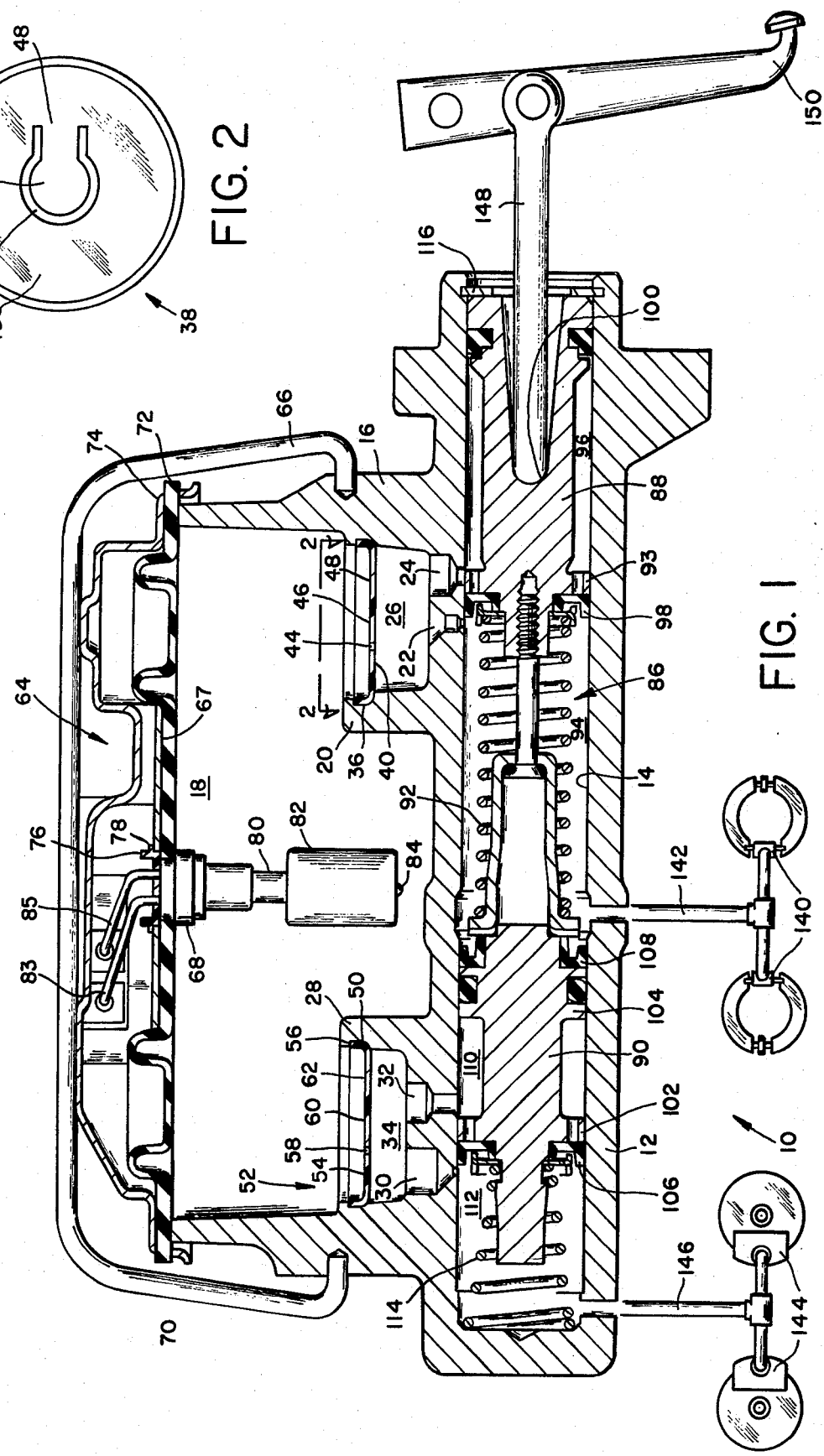

3,969,898

RESERVE RESERVOIR COVER

BACKGROUND OF THE INVENTION

In master cylinders where a piston is rapidly moved past a compensator port in response to an input force, a quantity of brake fluid is lost to the brake system by being squirted out into the reservoir. As long as there is fluid in the master cylinder reservoir, the squirting action which takes place during a brake actuation is not detrimental. However, if the fluid in the reservoir somehow is lost, the fluid in the brake system can also be depleted after several brake applications through this squirting action.

In order to retain the fluid in the brake system it has been disclosed by the prior art to place a small reservoir around the compensator port and place fixed baffles along the top of the small reservoir to modify the transmission of fluid from the small reservoir into the supply reservoir. Unfortunately, the fixed baffles also prevent the entry of various pieces of test equipment into the compensator ports which are needed to evaluate the operation of the master cylinder.

SUMMARY OF THE INVENTION

I have devised a cover means having a flapper valve for use in a retention reservoir in a tandem master cylinder which will allow fluid to freely flow into the retention reservoir but restrict flow in the opposite direction. The flapper valve can easily be moved by a probe on a test instrument to allow fluid under pressure to operate the master cylinder. The flapper valve will automatically close upon removal of the probe and return to a position substantially parallel to the cover means. The cover means has a peripheral surface which has an annular rib which is positioned in a groove in the wall of the retention reservoir. The location of the groove in the wall will establish the size of the retention chamber. This size must be sufficient to retain sufficient fluid to permit independent braking by each portion of the tandem master cylinder if a malfunction should occur in the other section.

It is therefore an object of this invention to provide a master cylinder having a supply reservoir and a retention reservoir means located therein with a flapper valve means whereby fluid can freely enter the retention reservoir but is restricted from flowing out of the retention reservoir toward the supply reservoir.

It is another object of this invention to provide a master cylinder reserve reservoir with a cover means having a flapper valve therein which will allow a probe to pass therethrough into engagement with a compensator port while preventing fluid from being squirted into a supply reservoir during a brake application.

It is another object of this invention to provide a master cylinder having a reservoir system with a supply chamber and a fixed retention chamber connected by a cover means having a restricted flow passage therethrough which will allow fluid to freely flow from the supply chamber into the fixed retention chamber but will prevent expulsion of a fixed volume of fluid from the retention chamber into the supply chamber and thereby assure that a braking system has a minimum volume of operational fluid.

These and other objects will become apparent from reading the specification and viewing the drawings.

BRIEF DESCRIPTION OF THE DRAWINGS

FIG. 1 is a sectional view of a master cylinder having a supply reservoir with first and second fluid retention chambers located therein into which fluid is communicated through a flapper valve in a cover means.

FIG. 2 is a sectional view taken along lines 2—2 of FIG. 1 showing the cover means and associated flapper valve located therein.

DETAILED DESCRIPTION OF THE PREFERRED EMBODIMENT

Figure 3:
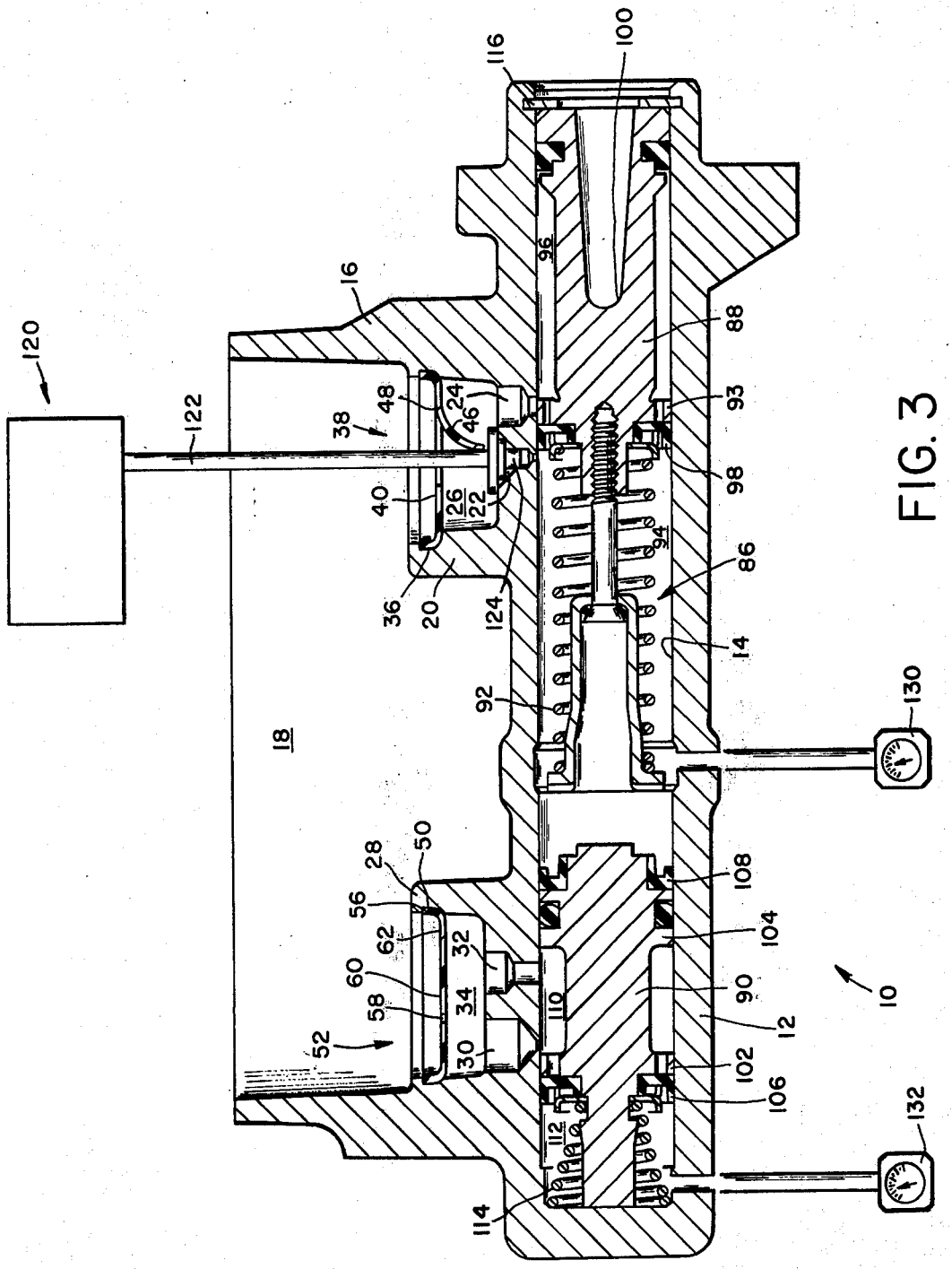
FIG. 3 is a sectional view of the master cylinder shown in FIG. 1 with a probe extending through the cover means to supply the power piston means with an independent source of fluid under pressure to allow an operator to check the operation characteristics of the master cylinder independently of any operator input force.

The master cylinder 10 shown in FIG. 1, has a housing 12 with an axial bore 14 located therein and a projection 16 which extends therefrom to form a supply reservoir 18. The housing 12 has a first shoulder 20 which surrounds a first compensator port 22 and a first relief port 24 to establish a first retention reservoir 26 in the supply reservoir 18 and a second shoulder 28 which surrounds a second compensator port 30 and a second relief port 32 to form a second retention reservoir 34 in the supply reservoir 18.

The first shoulder 20 has a groove 36 located along the top thereof for positioning a first cover means 38 in the retention reservoir 26. The first cover means 38 has a flat disc 40 with a rim 42 which snaps into the groove 36. As shown in FIG. 2, the flat disc 40 has a keyway 44 cut therein to allow the flapper means 46 to freely pivot about its base 48. The keyway 44 will allow fluid to freely flow from the supply reservoir 18 into the first retention reservoir 26.

The second shoulder 28 has a groove 50 located along the interior thereof for positioning a second cover means 52 in the second retention chamber 34. The second cover means 52 has a flat disc 54 with a rim 56 located on the periphery thereof which is snapped into groove 50. The flat disc 54 has a keyway 58 located therein to allow the flapper means 60 to pivot about its base 62.

A cap means 64 is located around the projection 16 by a spring retainer 66 to seal the supply reservoir 18 from the atmosphere. The cap means 64 has a shelf 67 into which a fluid lever sensor 68 is secured. A diaphragm 70 has a series of tabs 72 which extend through corresponding holes 74 in the cap means 64 to provide a fluid tight seal for the supply reservoir 18.

A fluid level sensor 68 has a base 76 which is fixed to the shelf 67 by a series of locking tabs 78. A stem 80 extends from the base 76 into the supply reservoir 18. A float 82 is retained on the stem 80 by a keeper 84. The position of the float 82 which carries a magnet will provide an actuation signal to operate a reed switch means (not shown) located in the stem 80. The reed switch means will allow an indication signal to be carried through lead lines 83 and 85 to inform an operator of the fluid level conditions within the supply reservoir 18.

A piston means 86 located in the axial bore 14 has a first piston 88 and a second piston 90 connected to each other through a cage spring means 92. A first shoulder 93 located on the first piston 88 substantially fills the axial bore 14 to separate a first pressurizing chamber 94 from a first relief chamber 96. A lip seal means 98 is located on adjacent the first shoulder to prevent fluid under pressure from being communicated between the pressurizing chamber 94 and the relief chamber 96. The first piston 88 has a depression 100 for receiving a push rod 148 from an input force means, either a manual or power assist apparatus.

The second piston 90 has a second shoulder 102 and a third shoulder 104 which substantially fills the axial bore 14 and carry lip seals 106 and 108 for preventing fluid under pressure from entering the second relief chamber 110 from either the second pressurizing chamber 112 or the first pressurizing chamber 94.

A return spring 114 located in the end of the axial bore 14 acts on the second piston 90 to hold the first piston 88 against stop 116.

MODE OF OPERATION OF THE PREFERRED EMBODIMENT

After a master cylinder 10 is built at the factory it is necessary to test the operation of the pressurizing piston means 86 to determine if the output required to be produced therefrom will cause a malfunction in a braking system. The master cylinder 10 is tested through a secondary pressurizing means 120, as shown in FIG. 3. The secondary pressurizing means 120 has a probe 122 which extends through the supply chamber 18 into the first retention reservoir 26 by opening the flapper valve 46 to allow end 124 to be held against the first compensator port 22. Fluid under pressure is then allowed to enter the first pressurizing chamber 94. With fluid in chamber 94, the first seal 98 will prevent loss of fluid into the first relief chamber 96. At the same time, as the pressure in the first pressurizing chamber 94 builds up, spring 114 will be overcome to allow the second piston 90 to move seal 106 past the second compensator port 30. As seal 106 moves past the second compensator port 30, a small amount of fluid in chamber 112 will be squirted out into the second retention chamber 34. The fluid which is squirted into chamber 34 will hit the flat disc 62 and be retained in the second retention chamber 34. After the pressure in the first pressurizing chamber 94 is built up as indicated on gauge 130 and retained for a predetermined period of time and in the second chamber 112 as indicated by gauge 132 without an apparent leak in the system, an assembly inspector can reasonably assume that the master cylinder will adequately perform in a vehicle. The probe means 120 is then removed from the first retention chamber 26. Since the flapper 46 is internally resilient, it returns to a plane substantially parallel to the disc 40. The cover means 64 is then attached to the projection 16 and the master cylinder is ready for installation on a vehicle.

When master cylinder means 10 is installed on a vehicle, the first pressurizing chamber 94 is connected to the front wheel brakes 140 through brake line 142 and the second pressurizing chamber 112 is connected to the rear wheel brakes 144 through brake line 146 and a push rod 148 is located in depression 100 of the first piston means 88.

When an operator applies an input force to brake pedal 150, push rod 148 will move the first piston 88 past the first compensator port 22 to build up pressure in the first pressurizing chamber 94 and be communicated to the front wheel brakes 140 through lead 142. When the pressure in the first pressurizing chamber reaches a predetermined value, the resiliency of the return spring 114 will be overcome to allow spring 92 to move the second piston 90 past the second compensator port 30 to allow fluid pressure to be built up in and supplied to the rear wheel brakes 144.

Depending upon the rate of application of the input force from the operator as the first piston 88 moves past the first compensator port 22 and the second piston 90 moves past the second compensator port 30, a portion of the fluid in the first chamber 94 and a portion of the fluid in the second chamber 112 will be squirted into the first retention chamber 26 and the second retention chamber 34. The flapper valves 46 and 60 on the first cover means 38 and second cover means 52 will intercept the fluid which is squirted and prevent expulsion into the supply reservoir. If a fluid leak should ever occur in the braking system and the supply in chamber 18 be depleted, the first cover means 38 and the second cover means 52 will assure that there is enough fluid in the first retention chamber 26 and the second retention chamber 34 to operate the piston means 86 in the axial bore even though the float 82 of the fluid level means 68 indicates a low fluid condition which will impair the operativeness of the master cylinder means 18.

We claim:
1. A master cylinder comprising:
a housing having an axial bore therein, said housing having a projection extending therefrom to form a supply reservoir adjacent the axial bore, said housing having a first compensator port for connecting the supply reservoir to a first pressurizing chamber in the axial bore and a second compensator port for connecting the supply reservoir to a second pressurizing chamber in the axial bore;
first shoulder means surrounding said first compensator port for establishing a first fixed retention chamber in the supply chamber;
second shoulder means surrounding said second compensator port for establishing a second fixed retention chamber in the supply chamber;
first cover means secured to said first shoulder means having a first flapper valve for preventing unrestricted fluid flow from the first retention chamber into the supply chamber;
second cover means secured to said second shoulder means having a second flapper valve for preventing unrestricted fluid flow from the second retention into the supply chamber;
piston means located in said axial bore for establishing said first and second pressurizing chambers therein; and
actuation means responsive to an input force for sequentially moving said piston means in said axial bore past said first compensator port to produce a first pressurizing fluid in said first pressurizing chamber and past said second compensator port to produce a second pressurizing fluid in said second pressurizing chamber, a portion of the fluid in the second pressurizing chamber being transmitted through said second compensator port into said second retention chamber during the time period required to move the piston means past said first compensator port and said second compensator port, said second flapper valve means intercepting said portion of the fluid in the second retention chamber to prevent expulsion into said supply chamber.

2. The master cylinder, as recited in claim 1, wherein said first flapper valve means includes:
 first tab means secured to said first cover means, said first tab means being adapted to maintain a parallel position with said first cover means.

3. The master cylinder, as recited in claim 2, wherein said second flapper valve means includes:
 second tab means secured to said second cover means, said second tab means being adapted to maintain a parallel position with said first cover means.

4. The master cylinder, as recited in claim 1, wherein said first cover means includes:
 a first annular rib which extends into a groove in said first shoulder means for locking the cover means in a fixed position on said first shoulder means to establish the size of said first fixed retention chamber.

5. The master cylinder, as recited in claim 3, wherein said second cover means includes:
 a second annular rib which extends into a groove in said second shoulder means for locking the cover means in a fixed position on said second shoulder means to establish the size of said second fixed retention chamber.

6. The master cylinder, as recited in claim 4, wherein said first flapper valve means further includes:
 first tab means extending from and in a plane parallel to said cover means, said first tab means being adapted to be engaged by a probe means to allow a test fluid under pressure to be communicated through said first compensator port into said first pressurizing chamber, said test fluid moving said piston means past said second compensator port to pressurize the fluid in the second pressurizing chamber and allow an operator to visually inspect said master cylinder for fluid failures.

7. The master cylinder, as recited in claim 6, wherein said first tab means automatically returns to said plane parallel to said cover means when said probe means is disengaged from said first compensator port to assure a minimum retention of fluid in said first retention chamber with a depletion in said supply chamber below said first shoulder.

* * * * *